(12) United States Patent
Decraemer

(10) Patent No.: US 8,248,825 B2
(45) Date of Patent: Aug. 21, 2012

(54) POWER FACTOR CONTROL CIRCUIT AND MAINS POWER SUPPLY

(75) Inventor: Alain Decraemer, Bruges (BE)

(73) Assignee: IP Vision Holding B.V., Eindhoven (NL)

( * ) Notice: Subject to any disclaimer, the term of this patent is extended or adjusted under 35 U.S.C. 154(b) by 198 days.

(21) Appl. No.: 12/744,336

(22) PCT Filed: Nov. 19, 2008

(86) PCT No.: PCT/IB2008/054848
§ 371 (c)(1),
(2), (4) Date: May 24, 2010

(87) PCT Pub. No.: WO2009/069039
PCT Pub. Date: Jun. 4, 2009

(65) Prior Publication Data
US 2010/0246218 A1   Sep. 30, 2010

(30) Foreign Application Priority Data
Nov. 26, 2007   (EP) .................................... 07121503

(51) Int. Cl.
*H02M 3/335* (2006.01)
(52) U.S. Cl. .................................................. 363/21.01
(58) Field of Classification Search .................... 363/16, 363/20, 20.01, 21.04, 95, 97, 131
See application file for complete search history.

(56) References Cited

U.S. PATENT DOCUMENTS 5,471,117 A   11/1995 Ranganath et al.
5,515,261 A   5/1996 Bogdan
5,568,041 A   10/1996 Hesterman
(Continued)

FOREIGN PATENT DOCUMENTS

BR   9804415 A   4/2000
DE   10032846 A1   1/2001

OTHER PUBLICATIONS

Chen et al: "A New Low-Stress Buck-Boost Converter for Universal-Input PFC Applications"; Colorodo Power Electronics Center, Department of Electrical and Computer Engineering, University of Colorado, IEEE 2001, pp. 343-349.

*Primary Examiner* — Adolf Berhane
(74) *Attorney, Agent, or Firm* — Shimokaji & Assoc., PC

(57) ABSTRACT

The invention relates to a power factor control circuit (10) and to a universal mains power supply (100). The power factor control circuit comprises input nodes (n1, n2) which receive a rectified input voltage being a rectified mains input voltage, and a drive circuit (IC1) which drives a switch (M1). A series arrangement of the switch and an inductor (L1) is arranged between the input nodes. A series arrangement of a rectifier (D1) and an output capacitor (C2) is arranged parallel to the inductor (L1). The rectifier is non-conductive when the switch is closed. The drive circuit drives the switch for generating a substantially sinusoidal current through the switch being substantially synchronized with a sinusoidal voltage of the mains input voltage. Due to the arrangement the output capacitor in the power factor control circuit according to the invention, the output capacitor can only be charged after a first conducting cycle of the switch. An effect of this arrangement is that no inrush current can occur until after the first conducting cycle of the switch which improves the reliability of the power factor control circuit according to the invention.

12 Claims, 6 Drawing Sheets

U.S. PATENT DOCUMENTS

| | | |
|---|---|---|
| 5,982,642 A | 11/1999 | Herfurth |
| 6,768,655 B1 | 7/2004 | Yang et al. |
| 7,190,151 B2 | 3/2007 | Ribarich et al. |
| 2004/0105287 A1 | 6/2004 | Choi et al. |
| 2005/0237010 A1 | 10/2005 | Ying et al. |
| 2005/0281059 A1* | 12/2005 | Yasumura ............... 363/16 |
| 2006/0132105 A1 | 6/2006 | Prasad et al. |
| 2007/0195560 A1* | 8/2007 | Yasumura ............ 363/21.01 |
| 2008/0025052 A1* | 1/2008 | Yasumura ............ 363/21.04 |
| 2009/0322237 A1* | 12/2009 | Bobel ..................... 315/224 |

* cited by examiner

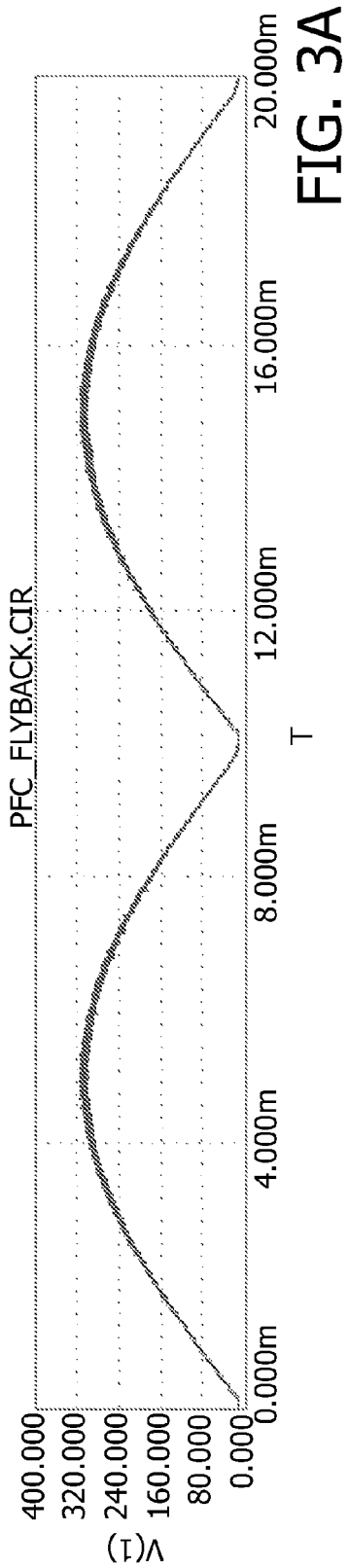
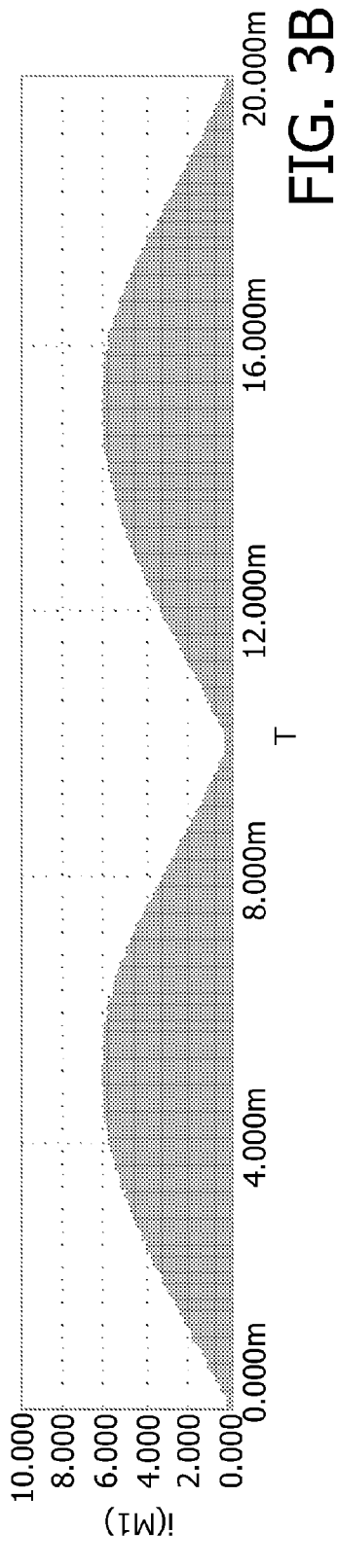
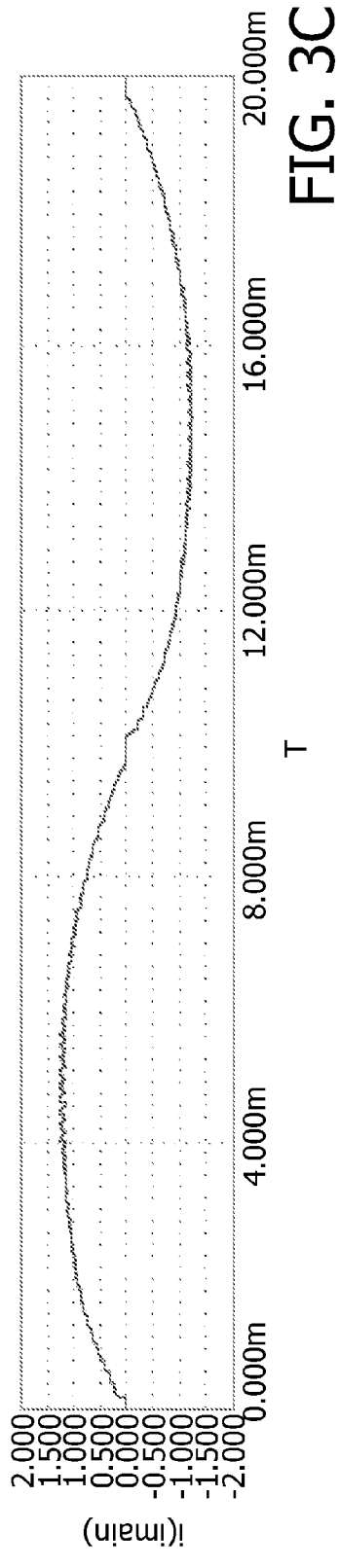
FIG. 3A
FIG. 3B
FIG. 3C

POWER FACTOR CONTROL CIRCUIT AND MAINS POWER SUPPLY

FIELD OF THE INVENTION

The invention relates to a power factor control circuit. The invention further relates to a mains power supply.

BACKGROUND OF THE INVENTION

Power factor correction is required to counteract any phase difference between the alternating voltage of the mains and the alternating current drawn from the mains by a reactive load. When an alternating current runs through a reactive load, a phase of the alternating current may be shifted by the reactive load, creating a phase difference between the alternating current and the alternating voltage. The power required by a load can be split into real power and reactive power, wherein the real power results from the resistive part of the load and the reactive power results from the reactive part of the load. In the pure reactive part of the load, the phase difference of the voltage and current is 90 degrees and so there is no net power flow, although these phase shifted voltages and currents run through the electrical components and wires. So the electrical components must be chosen such that they can withstand these phase shifted voltages and currents. Furthermore, the phase shifted voltages and current contribute to the energy loss in the system. As a consequence, the power factor representing a relationship between the reactive power and an apparent power should be substantially unity.

Power factor correction may be done passively and actively. In a passive correction of the power factor, the reactive character of the load is compensated for by adding capacitors and inductors such that the load behaves substantially as a resistive load.

Alternatively, the power factor may be corrected actively. A general configuration of a known active power factor control circuit is to use a power converter in a boost configuration also indicated as boost converter. This boost converter is arranged between a rectifier which rectifies the mains voltage and a load. In the known power factor control circuit the boost converter comprises a series arrangement of an inductor and a switch arranged between the nodes of the rectified mains. A series arrangement of a diode and an output capacitor being arranged parallel to the switch. The boost converter used as a power factor control circuit attempts to maintain a constant DC-voltage on its output while drawing a current from the mains that is substantially always in phase with the mains voltage and substantially at the same frequency as the mains voltage. In such a configuration, a further power converter may be arranged between the load and the known power factor control circuit to convert the boosted output power of the known power factor control circuit into the required voltage for the load.

A drawback of the known power factor control circuit is that the reliability of the known power factor control circuit is not good enough.

SUMMARY OF THE INVENTION

It is an object of the invention to improve the reliability of the power factor correction circuit.

According to a first aspect of the invention the object is achieved with a power factor control circuit comprising input nodes for receiving a rectified input voltage being a rectified mains input voltage,
a drive circuit for driving a switch,
a series arrangement of the switch and an inductor being arranged between the input nodes of the power factor control circuit,
a series arrangement of a rectifier and an output capacitor arranged parallel to the inductor, the rectifier being non-conductive when the switch is closed,
the drive circuit being arranged for driving the switch for generating a substantially sinusoidal current through the switch being substantially synchronized with a sinusoidal voltage of the mains input voltage.

An effect of the power factor control circuit according to the invention is that the configuration of the output capacitor together with the configuration of the rectifier prevents an inrush-current from occurring during the start-up of the power factor control circuit which improves a reliability of the power factor control circuit according to the invention compared to the known power factor control circuits. In the known power factor control circuits the mains input is directly connected to the output capacitor through the inductor and a diode. Because the output capacitor typically comprises a relatively large capacity, nothing limits the current flowing into the output capacitor causing the large inrush current. Due to the large inrush current, the inductor can relatively easily reach a saturation level causing the subsequent current through the switch of the known power factor correction circuit to become unregulated. When driving the switch in the known power factor correction circuit while the inductor has reached the saturation level, the current through the switch may become too large, thus damaging the switch of the known power factor correction circuit. This reduces the reliability of the known power factor control circuit.

In the power factor control circuit according to the invention, the output capacitor is arranged between the input nodes of the power factor control circuit via the switch. A first port of the output capacitor is connected to one of the input nodes of the power factor control circuit. A second port of the output capacitor is connected to the other input node of the power factor control circuit via a series arrangement of a rectifier, the inductor and the switch. The rectifier is configured to be non-conductive when the switch is closed. Due to this arrangement the output capacitor of the power factor control circuit according to the invention can only be charged after a first conducting cycle of the switch. When the switch is open, or in other words when the switch is non-conductive, substantially no current can flow through the inductor and thus no current can flow into the output capacitor which is substantially arranged parallel to the inductor. When the switch is closed, or in other words when the switch is conductive, current flows into the inductor which causes energy to be stored in the inductor. At the same time, the rectifier is non-conductive blocking any current flowing into the output capacitor, either from one of the input nodes or from the inductor. Only after the switch is opened again, the rectifier starts conducting allowing at least a part of the energy stored in the inductor to flow into the output capacitor. So before the first cycle of the conducting time of the switch, the inrush current simply cannot exist. Because the power factor control circuit according to the invention prevents the large inrush current from occurring, the damaging of the switch due to the large inrush current is prevented which improves a reliability of the power factor correction circuit according to the invention.

In known power factor control circuits solutions have been proposed to limit a too large current through the switch of the known power factor correction circuit. In a first solution, for example, the current through the switch is limited via a Negative Temperature Coefficient resistor (further also indicated as NTC resistor). The resistance value of the NTC resistor changes with temperature. When the application has not been used for some time, the temperature in the power supply typically is low which results in a relatively large resistance value of the NTC. At start-up of the power supply, a relatively large inrush current runs via the NTC resistor and thus is limited due to the relative large resistance value of the NTC resistor. When the power supply is running for some time, the temperature in the power supply is increased which reduces the resistance value of the NTC resistor. In an alternative known solution to improve the reliability of the power factor correction circuit, an additional switch is arranged parallel to the initial switch to improve switching capacity. However, these known solutions to improve the reliability not always prevent an inrush current through the switch of the power factor correction circuit and thus may still result in damage to the switch. Furthermore, all of these additional solutions require a considerable number of additional components which increases the cost of the known power factor control circuit.

In the power factor control circuit according to the invention, the arrangement of the components in the circuit prevents the inrush current from occurring. The output capacitor can only be charged after the conducting time of the switch. Because the switching frequency of the switch in a power factor control circuit is relatively high compared to the mains frequency, the current through the switch in each switching cycle is relatively low, limiting the current through the switch and thus further improving the reliability of the power factor control circuit according to the invention.

In an embodiment of the power factor control circuit, the drive circuit is configured for receiving a control signal to control an amplitude of the sinusoidal current through the switch for controlling a level of an output voltage being a voltage across the output capacitor. A benefit of this embodiment is that the power factor control circuit according to the invention enables to control a level output power at the output capacitor. The switch is driven at a frequency considerably higher than the mains frequency, thus forcing a sinusoidal current through the switch which is configured to be substantially synchronized with the mains voltage. In addition, the driver circuit receives a control signal. This control signal is used by the driver circuit to control an amplitude of the current through the switch which controls a level of the charging of the output capacitor. The level of charging of the output capacitor determines the level of the voltage across the output capacitor and thus determines the level of the output voltage of the power factor control circuit. So by switching the switch in the power factor control circuit according to the invention, the current through the power factor control circuit can be substantially sinusoidal and substantially synchronized, while the controlling of the amplitude of the current through the switch enables to control the level of the output voltage. As a result, the output voltage of the power factor control circuit according to the invention is controlled.

A further benefit of the power factor correction circuit according to the invention is that the controlled voltage at the output capacitor may be lower than the rectified mains output. In the known active power factor correction circuits, the active power factor correction circuits boost the rectified mains power to a voltage above the rectified peak power to generate a phase synchronization between the current through the switch and the mains voltage. When this boosted output power is used by, for example, further power converters, the electrical components of these further power converters must be able to withstand the boosted power. For example, the switches in these further power converters preferably should be able to withstand voltages above 400 volts. This typically requires more expensive switches in the further power converter, making the whole power supply relatively expensive. When applying the power factor correction circuit according to the invention, the controlled voltage across the output capacitor may be below the rectified mains due to the flyback topology of the current power factor correction circuit. The 'on'-time of the switch determines the current flowing into the output capacitor which controls a charging of the output capacitor, which determines the output voltage across the output capacitor. As a result, any further power converters which may be arranged for using the output voltage of the power factor correction circuit may use relatively low-voltage switches, which further reduces a cost of the power system according to the invention.

In an embodiment of the power factor control circuit, the control signal is associated with the output voltage for regulating the output voltage. Using the control signal enables the power factor control circuit according to the invention to regulate the output voltage at a predetermined level, thus providing a regulated output voltage.

The known power factor control circuit may generate a pre-regulated output voltage. This pre-regulated output voltage is typically generated via an auxiliary winding at the inductor of the known power factor control circuit. However, the ripple of this pre-regulated output voltage is relatively large such that it is only possible to efficiently draw only a relatively small power from the pre-regulated output voltage. In fact, the pre-regulated output voltage via the auxiliary winding is typically used only to drive a control circuit of the known power factor control circuit at primary side. Such a control circuit typically only draws a few milli-amperes. In the power factor control circuit according to the invention, the drive circuit controls an amplitude of the sinusoidal current through the switch such that the output voltage across the output capacitor is regulated.

In an embodiment of the power factor control circuit, the rectifier is a diode, or a diode bridge, or a further switch being configured to be non-conductive when the switch (M1) is closed. The diode is arranged such that when the switch is closed (or conductive), the rectifier prevents charge from the output capacitor to leak away via the switch. The current flowing through the switch can only flow via the inductor which causes power to be stored in the inductor during a time interval when the switch is closed. When the switch is open, part of the stored energy in the inductor flows via the rectifier into the output capacitor thus regulating the charge in the output capacitor which controls the voltage across the output capacitor and thus controls the output voltage of the power factor control circuit according to the invention.

In an embodiment of the power factor control circuit, the inductor is a primary winding in a transformer, a secondary winding of the transformer being connected in series with a further rectifier and a further output capacitor for providing an additional output voltage. A benefit of this embodiment is that the voltage across the output capacitor and across the further output capacitor are linked via the transformer. By regulating the voltage across the output capacitor, the voltage across the further output capacitor is also regulated providing two regulated output voltages of the power factor control circuit according to the invention.

In the known power factor control circuit a secondary winding may also be used to generate a pre-regulated power supply. However, generally the ripple of this pre-regulated output voltage is relatively large and thus it is only possible to efficiently use only relatively low power from this pre-regulated output voltage. Using the secondary winding in the power factor control circuit according to the invention, this additional output power may be used to provide power without the limitation of only using relatively low power because the huge mains ripple does not exist. The power factor control circuit according to the invention may be considered as a flyback supply thus saving the cost of an additional power supply.

In an embodiment of the power factor control circuit, the drive circuit is configured for controlling an 'on'-time of the switch, a duration of the 'on'-time determining the output voltage. The 'on'-time of the switch determines the amount of power pumped into the output capacitor and thus controls the voltage across the output capacitor determining the output voltage.

In an embodiment of the power factor control circuit, the drive circuit is configured for varying the 'on'-time of the switch for stabilizing the output voltage. When the load, for example, draws a predetermined power from the output capacitor, the output voltage across the output capacitor may drop. By adapting the 'on'-time of the switch, the drive circuit can regulate the power which is pumped into the output capacitor to replenish the output capacitor for stabilizing the output voltage.

In an embodiment of the power factor control circuit, the drive circuit is configured for controlling a peak current through the switch for determining the output voltage. By controlling a peak current through the switch, the drive circuit controls a power which is pumped into the output capacitor. A benefit of this embodiment is that the controlling of the peak current through the switch provides a further improvement of the reliability of the power factor control circuit according to the invention. If, at start-up of the power factor control circuit, a relatively large peak current may rush through the circuit, the drive circuit limits the current running through the switch which prevents the switch from damaging.

In an embodiment of the power factor control circuit, the drive circuit is configured for varying the peak current for stabilizing the output voltage. When the load draws additional power from the output capacitor, the drive circuit can increase the replenishment of power into the output capacitor by increasing the peak current through the switch such that the output voltage is stabilized to a predetermined level.

The invention also relates to a universal mains power supply as claimed in claim 10.

In an embodiment of the universal mains power supply, an inverter circuit is arranged parallel to the output capacitor for converting the regulated output voltage into a regulated alternating output voltage. This embodiment is, for example, beneficial when a universal mains supply is used to drive, for example, cold-cathode fluorescent lamps (also further indicated as CCFL lamps), for example, for use in a backlighting system. These CCFL lamps typically require alternating output voltage during operation.

In an embodiment of the universal mains power supply, the inverter circuit comprises an inverter driver, a series arrangement of a first inverter switch and a second inverter switch arranged parallel to the output capacitor, and a series arrangement of a further inductor and a smoothing capacitor arranged parallel to the second inverter switch, the inverter driver being configured for driving the first switch and the second switch for converting the rectified regulated output voltage into the regulated alternating output voltage.

In an embodiment of the universal mains power supply, the further inductor is a primary winding of a transformer comprising a further secondary winding being coupled to a load via a further smoothing capacitor. A benefit when using a transformer is that the transformer provides galvanic separation. Furthermore, the transformer can be used to increase the amplitude of the alternating output voltage at the further secondary winding.

This is especially beneficial when driving CCFL lamps, as these CCFL lamps require an alternating voltage of approximately 2 kilo-Volts.

BRIEF DESCRIPTION OF THE DRAWINGS

These and other aspects of the invention are apparent from and will be elucidated with reference to the embodiments described hereinafter.

In the drawings:

FIG. 3A shows the rectified mains voltage, FIG. 3B shows the current through the switch, and FIG. 3C shows the resulting current as seen from the mains versus time.

The figures are purely diagrammatic and not drawn to scale. Particularly for clarity, some dimensions are exaggerated strongly. Similar components in the figures are denoted by the same reference numerals as much as possible.

DETAILED DESCRIPTION OF THE EMBODIMENTS

Figure 1:
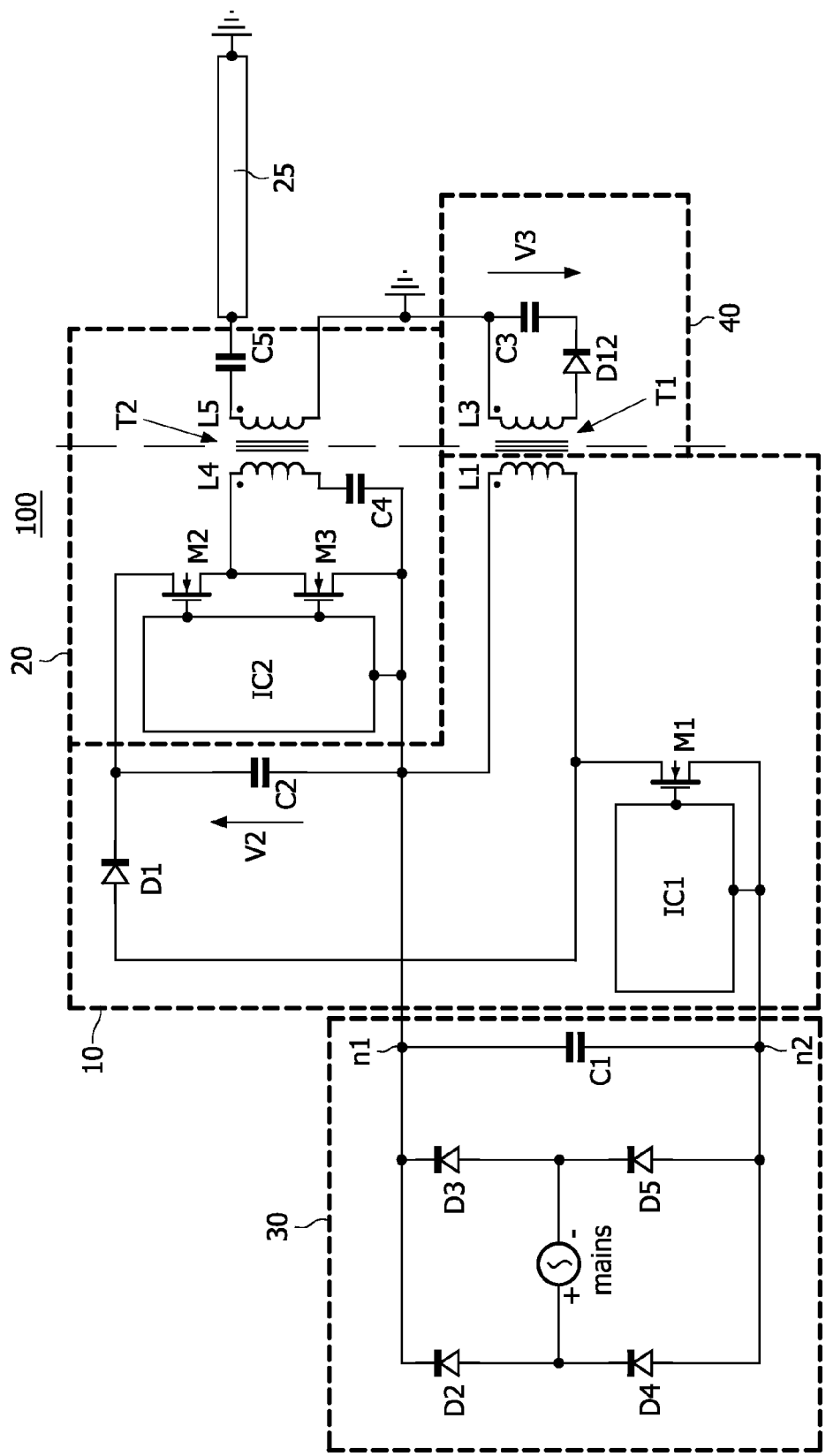
FIG. 1 shows a schematic representation of the power factor control circuit and universal mains power supply according to the invention.

FIG. 1 shows a schematic representation of the power factor control circuit 10 and universal mains power supply 100 according to the invention. The power factor control circuit 10 is arranged between a mains rectifying circuit 30 and the load 20. The mains rectifying circuit 30 comprises a rectifying bridge comprising four diodes D2, D3, D4, D5 and comprises a smoothing capacitor C1. This smoothing capacitor typically has a relatively low capacitance to ensure a relatively long conducting time of the diodes D2, D3, D4, D5 of the diode bridge. The rectified mains voltage is provided to the output nodes n1, n2 of the mains rectifying circuit 30. The output nodes n1, n2 of the mains rectifying circuit 30 are the input nodes n1, n2 of the power factor control circuit 10. The power factor control circuit 10 as shown in FIG. 1 comprises a drive circuit IC1 for driving a switch M1. The drive circuit IC1 is arranged for driving the switch M1 to generate a substantially sinusoidal current through the switch M1 which is substantially synchronized with a sinusoidal voltage of the mains input voltage. The power factor control circuit 10 further comprises an inductor L1 in which a series arrangement of the switch M1 and the inductor L1 is arranged between the input nodes n1, n2 of the power factor control circuit 10. Parallel to the inductor L1 a series arrangement of a rectifier D1 and an output capacitor C2 is arranged. The rectifier D1 is configured to be non-conductive when the switch M1 is closed. In the embodiment of the power factor control circuit 10 as shown in FIG. 1, the rectifier D1 is a diode D1. Alternatively, the rectifier D1 may a diode bridge (not shown), or a further switch (not shown) which is configured to be non-conductive when the switch M1 is closed.

The arrangement of the power factor control circuit 10 according to the invention improves a reliability of the power factor control circuit 10 in that it prevents an inrush current to occur. In the power factor control circuit 10 according to the invention, the output capacitor C2 is arranged between the input nodes n1, n2 of the power factor control circuit 10 via the switch. A first port of the output capacitor C2 is connected to one of the input nodes n1 of the power factor control circuit 10. A second port of the output capacitor C2 is connected to the other input node n2 of the power factor control circuit 10 via a series arrangement of the rectifier D1, the inductor L1 and the switch M1. The rectifier D1 is non-conductive when the switch M1 is closed. As a result of this configuration, the output capacitor C2 can only be charged after a first conducting cycle of the switch M1. When the switch M1 is open (non-conductive) no current can flow through the inductor L1 and thus no current can flow into the output capacitor C2 which is substantially arranged parallel to the inductor L1. When the switch M1 is closed (conductive), current flows through the inductor L1 causing energy to be stored in the inductor L1. At the same time, the rectifier D1 is non-conductive, blocking any current flowing directly into the output capacitor C2 from the rectified mains input n1. Only after the switch M1 is opened (non-conductive) again, the rectifier D1 starts conducting allowing at least part of the energy stored in the inductor L1 to flow into the output capacitor C2. So before the first conducting cycle of the conducting time of the switch M1, no current can flow into the output capacitor or into the inductor L1 and thus the inrush current simply cannot occur.

The power factor control circuit 10 in the current configuration is a flyback configuration. When drive circuit IC1 receives a feedback signal (see FIG. 2), this feedback signal may be used to control the output voltage V2 across the output capacitor C2. The feedback signal may, for example, be the output voltage V2 across the output capacitor C2 or a signal associated to the output voltage V2. The controlling of the output voltage V2 may, for example, include regulating or stabilizing the output voltage V2. Due to the flyback arrangement of the power factor control circuit 10, the voltage across the output capacitor C2 not necessarily need to be boosted to regulate the power factor. In the configuration of the known power factor control circuit, the known power factor control circuit comprises a boost configuration to correct the power factor to substantially unity. This boost configuration has several disadvantages in that the inrush current may be relatively high and in that the boosting of the output voltage requires the electrical components of the load 20 connected across the output capacitor C2 of the known power factor control circuit to be able to withstand the boosted rectified output voltage. Such electrical components typically are more expensive than low-voltage electrical components, which increases the cost in the known power factor control circuit. Due to the flyback configuration of the power factor control circuit 10 according to the invention, the output voltage V2 across the output capacitor C2 may be regulated to a relatively low voltage while controlling the power factor to substantially unity.

The drive circuit IC1 may, for example, control an 'on'-time Ton (see FIG. 6) of the switch M1 in which a duration of the 'on'-time Ton determines the output voltage V2. The 'on'-time Ton of the switch M1 determines the amount of power pumped into the output capacitor C2 and thus controls the voltage across the output capacitor C2 determining the output voltage V2. By varying the 'on'-time Ton, the output voltage V2 may, for example, be regulated or stabilized. The variation of the 'on'-time Ton may, for example, be based on the feedback signal. Alternatively, the drive circuit IC1 may, for example, control a peak current Ipeak (see FIG. 6) through the switch M1. The peak current Ipeak controls the power which is pumped into the output capacitor C2 and thus determines the output voltage V2. By varying the value of the peak current Ipeak, the output voltage V2 may, for example, be regulated or stabilized.

In the embodiment of the power factor control circuit 10 as shown in FIG. 1, the inductor L1 is a primary winding of a transformer T1. The secondary winding L3 of the transformer T1 may be used to provide an additional output voltage V3 via an additional output circuit 40. The additional output circuit 40 comprises a further rectifier D12 and a further output capacitor C3 arranged in series. The additional output voltage V3 is linked to the output voltage V2 of the power factor control circuit 10 via the transformer T1. As a consequence, when the output voltage V2 of the power factor control circuit 10 is regulated or stabilized, so is the additional output voltage V3. Furthermore, the transformer T1 generates a galvanic separation of any load attached across the further output capacitor C3 and enables the additional output voltage V3 to be different than the output voltage V2. Due to the link between the output voltage V2 and the additional output voltage V3, this additional output voltage V3 may also be used as feedback signal for regulating or stabilizing the output voltage V2 (as is shown in the circuit of FIG. 2).

The load 20 of the power factor control circuit 10 may be any load 20, preferably a load 20 which requires power factor control. Especially when the output voltage V2 across the output capacitor C2 is regulated or stabilized the load 20 may be any application which requires a stabilized rectified output voltage V2. The load 20 may also be a further power converter 20 for converting the rectified output voltage V2 into a further output voltage. In the embodiment shown in FIG. 1, the load 20 of the power factor control circuit 10 is an inverter circuit 20 which converts the rectified output voltage V2 of the power factor control circuit 10 into an alternating output voltage across a further inductor L4. The inverter circuit 20 comprises an inverter driver IC2 for driving a first inverter switch M2 and a second inverter switch M3 which are arranged in series. The series arrangement of the first inverter switch M2 and the second inverter switch M3 is arranged parallel to the output capacitor C2 of the power factor control circuit 10. The inverter driver IC2 drives the first switch M2 and the second switch M3 alternatingly and converts the rectified output voltage V2 across the output capacitor C2 into the alternating output voltage. Furthermore, the inverter circuit 20 comprises a series arrangement of a further inductor L4 and a smoothing capacitor C4 arranged parallel to the second inverter switch M3. In the embodiment as shown in FIG. 1 the further inductor L4 is a primary winding L4 of a further transformer T2. A further secondary winding L5 of the further transformer T2 is, for example, connected via a further smoothing capacitor C5 to a cold-cathode fluorescent lamp 25 being the load 25 of the inverter circuit 20. The further transformer T2 may be used to generate a galvanic separation between the CCFL lamp 25 and mains, and may be used to boost an amplitude of the alternating output voltage, for example, to 2 kilo-Volts which is required to operate CCFL lamps 25.

Figure 2:
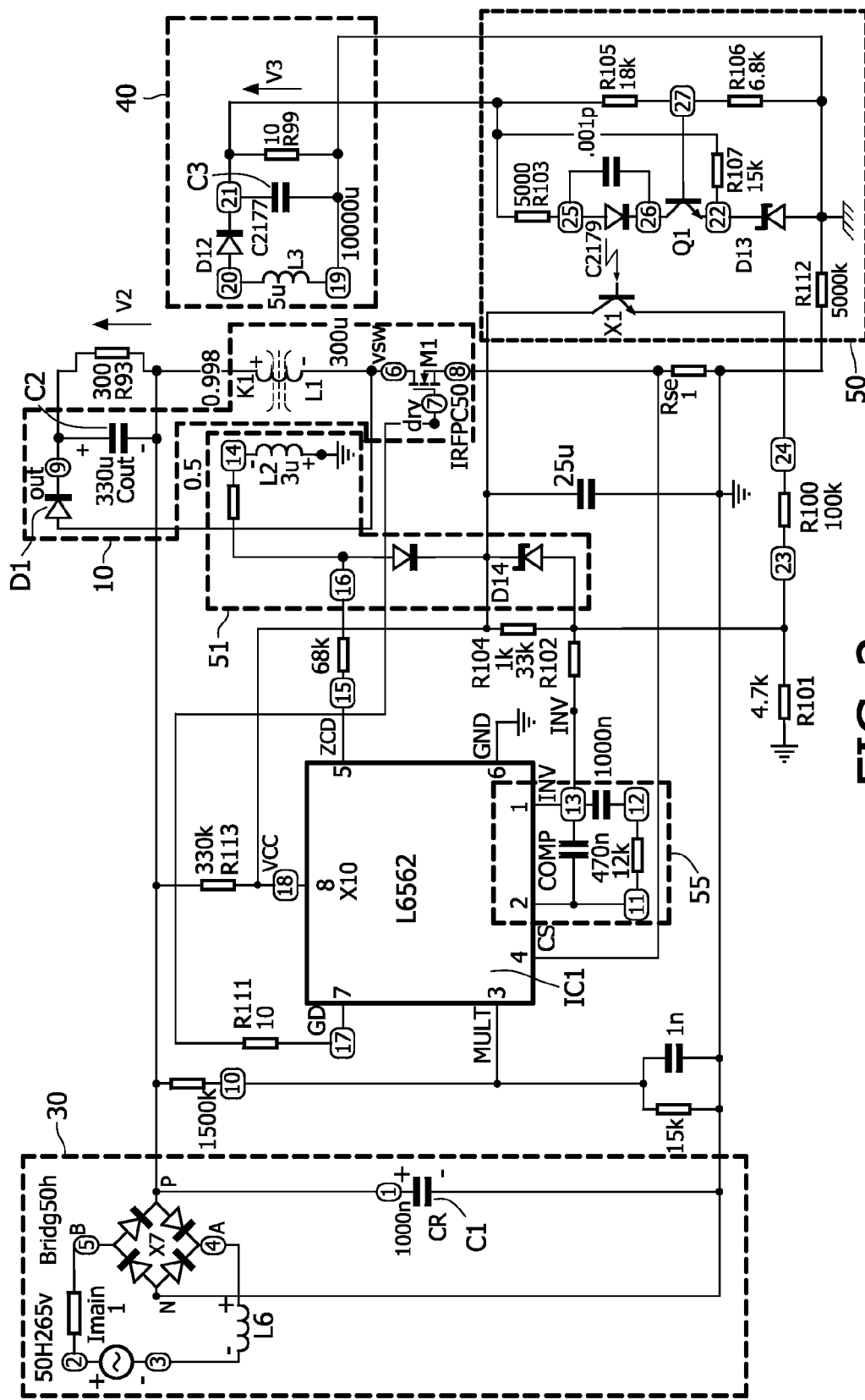
FIG. 2 shows a circuit diagram of an embodiment of the universal mains power supply according to the invention.

FIG. 2 shows a circuit diagram of an embodiment of the universal mains power supply 100 according to the invention. In the circuit diagram shown in FIG. 2, the mains rectifying circuit 30 and the power factor control circuit 10 have again been indicated with dashed polygons. For clarity reasons, the polygon having reference number 10 which indicates the power factor control circuit 10 does not include the drive circuit IC1 because the polygon would become too complex. However, the drive circuit IC1 is, of course, part of the power factor control circuit 10. The load 20 of the power factor control circuit 10 is indicated with a resistor R93 and may be any load 20 as already indicated, including the further power converter 20 (see FIG. 1). The mains rectifying circuit 30 also comprise a high-harmonic filtering inductor L6. The additional output circuit 40 has also been indicated with a dashed rectangle having reference number 40. A mosfet M1 is used as the switch M1 of the power factor control circuit 10.

The circuit diagram as shown in FIG. 2 further comprises a sense circuit 50 in which the additional output voltage V3 is compared to a reference voltage produced by a Zener diode D13. The difference between the additional output voltage V3 and the reference voltage is provided via an opto-coupler X1 to the drive circuit IC1 as an error voltage.

Circuit 51 is an auxiliary supply for the drive circuit IC1. It generates the VCC voltage of L6562 (pin 8) by rectifying the positive regulated part of an auxiliary output voltage across an auxiliary inductor L2. Furthermore, circuit 51 also enables the opto-coupler X1 to drive a current (when activated) to pin 1 of the drive circuit IC1 (the input of the error voltage).

In the embodiment of the universal mains power supply 100 as shown in FIG. 2, the drive circuit IC1 is an L6562 PFC-controller. This drive circuit IC1 controls the output voltage V2 by controlling the peak current Ipeak (see FIG. 6) of the current through the switch M1. The feedback signal being the error voltage which is sensed at the sense circuit 50 is provided to the drive circuit IC1 on pin 2 of the L6562. The drive circuit IC1 further receives the mains rectified voltage on pin 3. The drive circuit IC1 multiplies the error voltage of pin 2 with the mains rectified voltage of pin 3 using a long time constant compared to the mains frequency (being 50 or 60 Hertz). The result of this multiplication determines the maximum peak current Ipeak in the switch M1 via its image across the resistor Rse connected to pin 4. Varying the peak current Ipeak according to the sensed error voltage enables the drive circuit IC1 to regulate or stabilize the output voltage V2 while controlling the power factor of the universal mains power supply 100 to substantially unity.

Alternatively, the drive circuit IC1 may, for example, be a NCP1606 PFC-controller. This drive circuit IC1 controls an 'on'-time Ton of the switch M1 to regulate the output voltage V2. The 'on'-time Ton of the switch M1 determines the amount of power pumped into the output capacitor C2 and thus controls the voltage across the output capacitor C2 determining the output voltage V2. The drive circuit IC1 may, for example, also uses the error voltage associated with the additional output voltage V3 to determine the 'on'-time Ton of the switch M1. By varying the 'on'-time Ton of the switch M1 the drive circuit IC1 may regulate or stabilize the output voltage V2.

FIG. 3A shows the rectified mains voltage V(1) versus time T, FIG. 3B shows the current i(M1) through the switch M1 versus time T, and FIG. 3C shows the resulting current i(main) as seen from the mains versus time T. As can be seen from FIG. 3C the current i(main) through the switch M1 has a substantially sine-wave form.

Figure 4A:
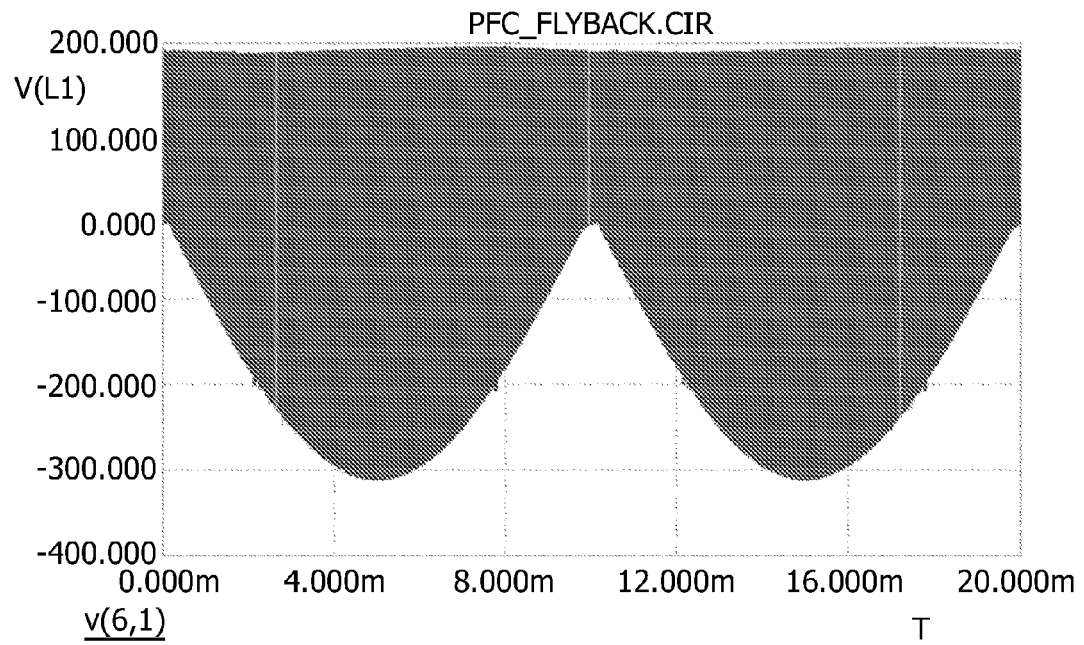
FIG. 4A shows a voltage across the inductor of the power factor correction circuit.
Figure 4B:
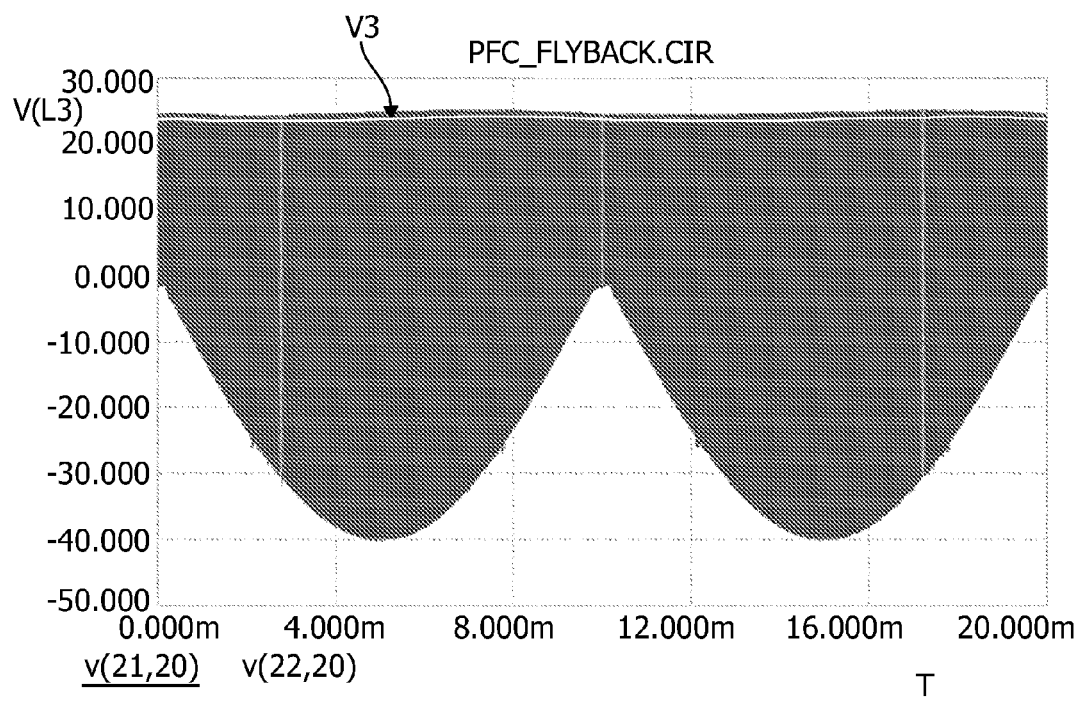
FIG. 4B shows a voltage across the secondary winding of the transformer comprising the inductor of the power factor control circuit.

FIG. 4A shows a voltage V(L1) across the inductor L1 of the power factor control circuit 10. As can be seen from FIG. 4A the envelope of the positive part is rectified with the diode D1 and gives the regulated output voltage V2. The negative part of the voltage V(L1) across the inductor L1 is an image of the rectified mains voltage. FIG. 4B shows a voltage V(L3) across the secondary winding L3 of the transformer T1 comprising the inductor L1 of the power factor control circuit 10. As can be seen from FIGS. 4A and 4B substantially the same waveform of the voltage V(L3) across the secondary winding L3 is obtained as the waveform of the voltage V(L1) across the inductor L1. As a consequence, the additional output voltage V3 follows the output voltage V2 and thus because the level of the output voltage V2 is controlled to generate a regulated output voltage V2, also the additional output voltage V3 is regulated.

The voltage V3 across the further output capacitor C3 (see FIG. 1) still comprises a relatively small 100 Hertz ripple. This 100 Hertz ripple is due to the fact that the envelope of the current which loads the output capacitor C2 (which is the same envelop as i(M1) on FIG. 3B) has a big 100 Hz content resulting from rectified 50 Hz. This 100 Hz content cannot be fully integrated in the output capacitor C2 because the frequency is too low. As a result, a residual ripple remains on the output voltage V2 across the output capacitor C2. This ripple is inverse proportional to the capacitance value of the output capacitor C2. Because the further output voltage V3 across the further output capacitor C3 is the image of the output voltage V2, this ripple can also be seen on the further output voltage V3.

Figure 5:
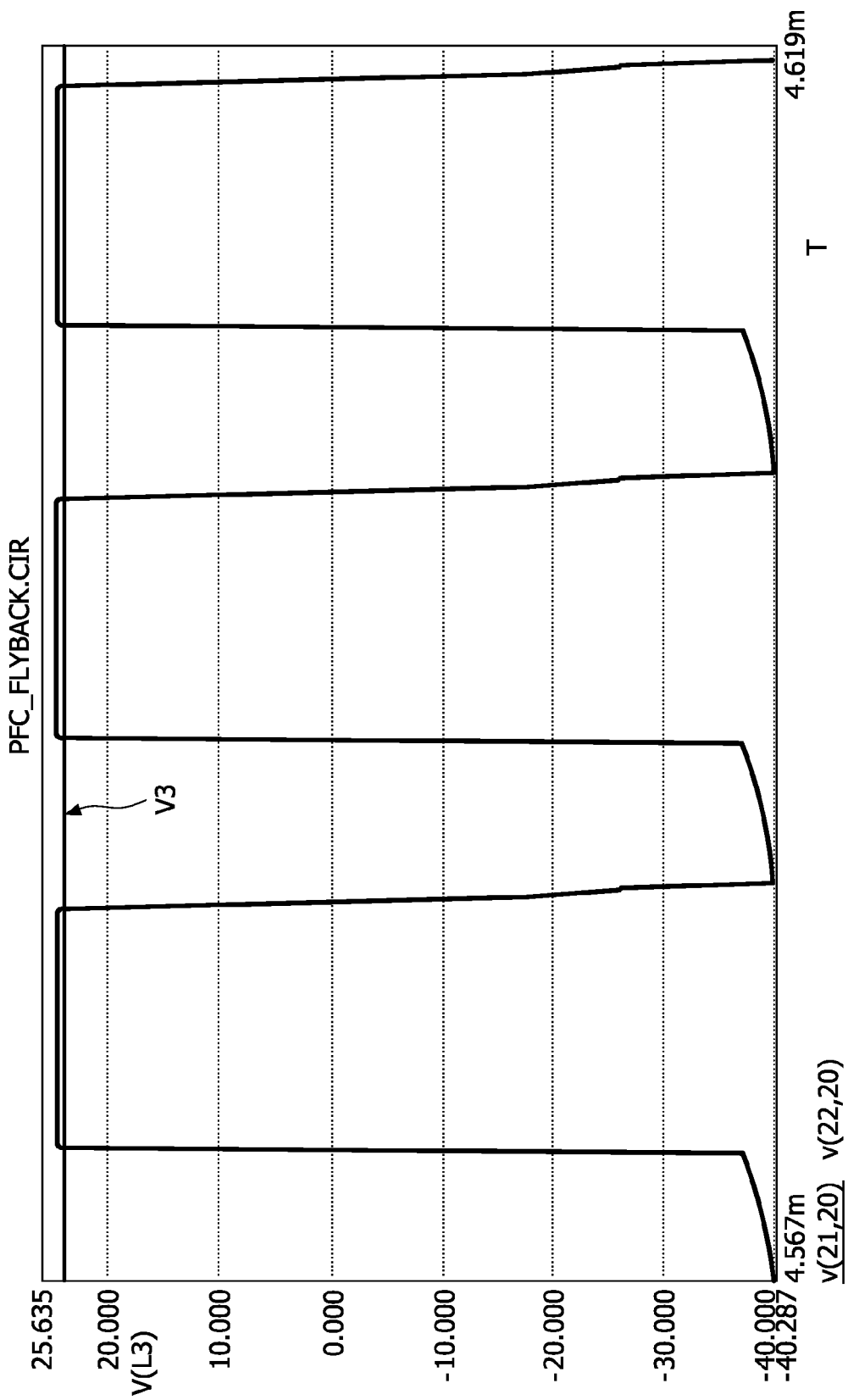
FIG. 5 shows the voltage across the secondary winding in more detail.

FIG. 5 shows the voltage V(L3) across the secondary winding L3 in more detail. The drive circuit IC1 drives the switch M1 at a frequency within a range between 30 kilo-Hertz and 80 kilo-Hertz. This can be seen in the detailed view of FIG. 5 as substantial block-waves. The frequency chosen mainly depends on the load 20 of the power factor control circuit 10. The substantially horizontal line at voltage level 24 Volts is the rectified output voltage V3 across the further output capacitor C3.

Figure 6:
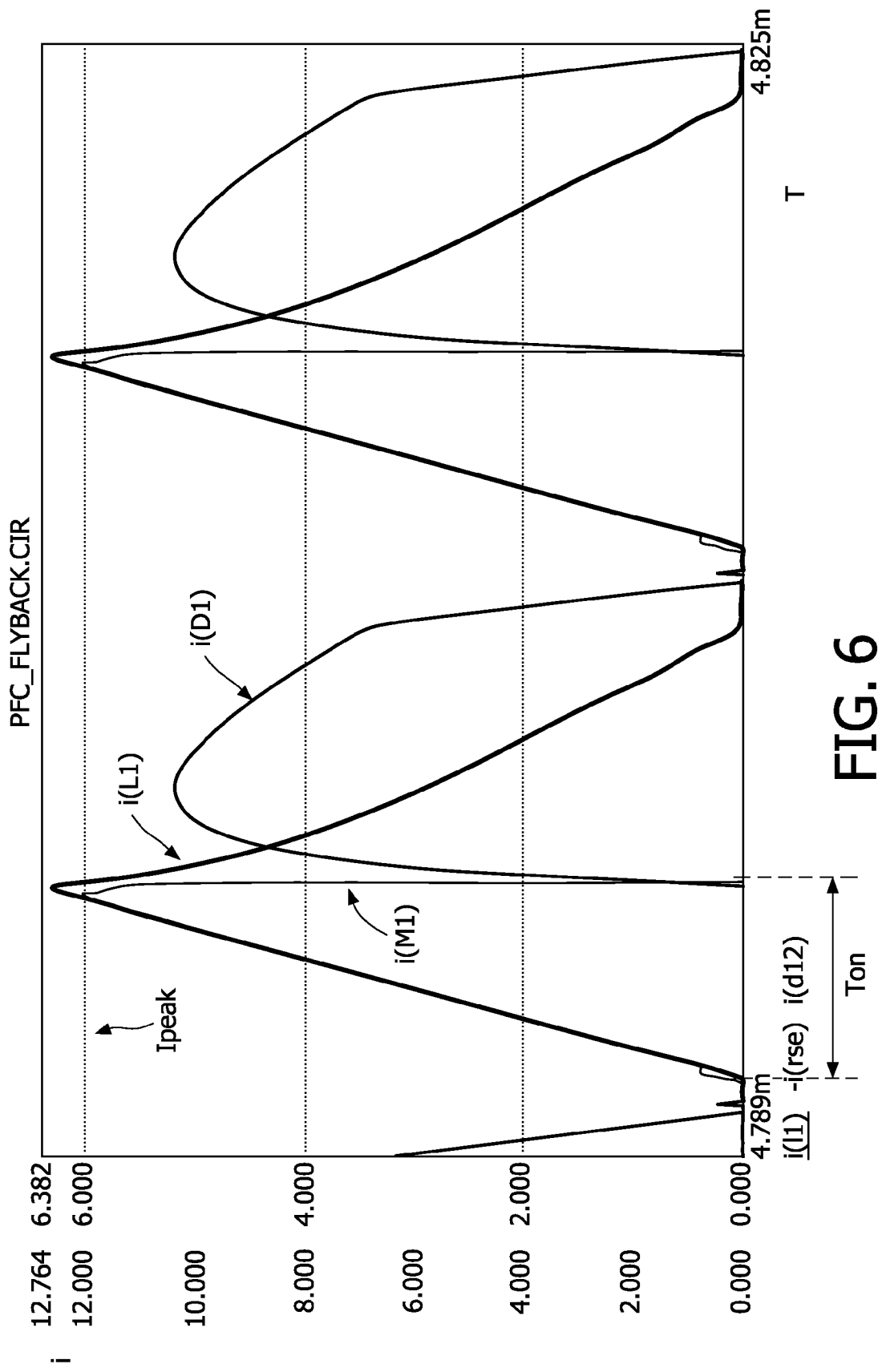
FIG. 6 shows the current through the switch, the current through the inductor, and the current through the rectifier versus time of the power factor control circuit according to the invention.

FIG. 6 shows the current i(M1) through the switch M1, the current i(L1) through the inductor L1, and the current i(D1) through the rectifier D1 versus time T of the power factor control circuit 10 according to the invention. As can be seen from FIG. 6, the switch M1 is closed and conducts the current i(M1). At the same time, the current i(L1) through the inductor L1 also increases. After a predetermined 'on'-time Ton, or after the current i(M1) through the switch M1 reaches a predetermined peak current Ipeak, the drive circuit IC1 switches off the switch M1 which stops conducting. The rectifier D1 starts conducting as can be seen by the current i(D1) through the rectifier D1 and starts to charge the output capacitor C2 while the current i(L1) through the inductor L1 decreases. When the current i(L1) through the inductor L1 stops flowing, also the rectifier D1 is non-conductive storing the energy transferred from the inductor L1 to the output capacitor C2 in the output capacitor C2.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A power factor control circuit comprising:
   input nodes for receiving a rectified input voltage, said rectified input voltage being a rectified mains input voltage;

a series arrangement of a switch and an inductor arranged between the input nodes;

a series arrangement of a rectifier and an output capacitor arranged parallel to the inductor, the rectifier being non-conductive when the switch is closed; and a drive circuit for driving the switch for generating a substantially sinusoidal current through the switch being substantially synchronized with a sinusoidal voltage of the mains input voltage, the drive circuit further receiving a control signal to control an amplitude of the sinusoidal current through the switch for controlling a level of an output voltage of the power factor control circuit, the output voltage being a voltage across the output capacitor, wherein the inductor is a primary winding in a transformer, a secondary winding of the transformer being connected in series with a further rectifier and a further output capacitor for providing an additional output voltage, said addition output voltage being regulated and following the output voltage.

2. The power factor control circuit as claimed in claim 1, wherein the control signal to control the amplitude of the sinusoidal current through the switch comprises the additional output voltage for controlling the level of the output voltage.

3. The power factor control circuit as claimed in claim 1, wherein the control signal is associated with the output voltage for regulating the output voltage.

4. The power factor control circuit as claimed in claim 1, wherein the rectifier is a diode, or a diode bridge, or a further switch being configured to be non-conductive when the switch is closed.

5. The power factor control circuit as claimed in claim 2, wherein the drive circuit is configured for controlling an 'on'-time of the switch, a duration of the 'on'-time determining the output voltage.

6. The power factor control circuit as claimed in claim 5, wherein the drive circuit is configured for varying the 'on'-time of the switch for stabilizing the output voltage.

7. The power factor control circuit as claimed in claim 1, wherein the drive circuit is configured for controlling a peak current through the switch for determining the output voltage.

8. The power factor control circuit as claimed in claim 7, wherein the drive circuit is configured for varying the peak current for stabilizing the output voltage.

9. A universal mains power supply comprising the power factor control circuit as claimed in claim 1.

10. The universal mains power supply as claimed in claim 9, wherein an inverter circuit is arranged parallel to the output capacitor for converting the regulated output voltage into a regulated alternating output voltage.

11. The universal mains power supply as claimed in claim 10, wherein the inverter circuit comprises an inverter driver, a series arrangement of a first inverter switch and a second inverter switch arranged parallel to the output capacitor, and a series arrangement of a further inductor and a smoothing capacitor arranged parallel to the second inverter switch, the inverter driver being configured for driving the first inverter switch and the second inverter switch for converting the rectified regulated output voltage into the regulated alternating output voltage.

12. The universal mains power supply as claimed in claim 11, wherein the further inductor is a primary winding of a further transformer comprising a further secondary winding being coupled to a load via a further smoothing capacitor.

* * * * *